US009888231B2

(12) United States Patent
Wei

(10) Patent No.: US 9,888,231 B2
(45) Date of Patent: Feb. 6, 2018

(54) THREE-DIMENSIONAL DISPLAY DEVICE

(71) Applicant: BOE TECHNOLOGY GROUP CO., LTD., Beijing (CN)

(72) Inventor: Wei Wei, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 755 days.

(21) Appl. No.: 14/358,416

(22) PCT Filed: Dec. 5, 2013

(86) PCT No.: PCT/CN2013/088599
§ 371 (c)(1),
(2) Date: May 15, 2014

(87) PCT Pub. No.: WO2015/035713
PCT Pub. Date: Mar. 19, 2015

(65) Prior Publication Data
US 2015/0070476 A1 Mar. 12, 2015

(30) Foreign Application Priority Data

Sep. 11, 2013 (CN) .......................... 2013 1 0412240

(51) Int. Cl.
H04N 13/04 (2006.01)

(52) U.S. Cl.
CPC ..... *H04N 13/0404* (2013.01); *H04N 13/0409* (2013.01); *H04N 13/0415* (2013.01)

(58) Field of Classification Search
CPC ............. H04N 13/0404; H04N 13/404; H04N 13/0409; H04N 13/409; H04N 13/415; H04N 13/0415

(Continued)

(56) References Cited

U.S. PATENT DOCUMENTS

2008/0278483 A1* 11/2008 Hong ................. H04N 13/0404
345/419
2010/0091205 A1* 4/2010 Wu ..................... G02B 27/2214
349/15

(Continued)

FOREIGN PATENT DOCUMENTS

CN 101287140 A 10/2008
CN 101655609 A 2/2010

(Continued)

OTHER PUBLICATIONS

International Search Report, International Preliminary Report on Patentability and Written Opinion of the International Searching Authority of PCT/CN2013/088599 in Chinese, dated Jun. 18, 2014.

(Continued)

*Primary Examiner* — Mohammed Rahaman
*Assistant Examiner* — Jimmy S Lee
(74) *Attorney, Agent, or Firm* — Collard & Roe, P.C.

(57) ABSTRACT

A three-dimensional (3D) display device comprises a display panel and a grating disposed on one side of the display panel. The display panel includes a plurality of first display units and a plurality of second display units; the first display units and the second display units are alternately arranged in both a transverse direction and a longitudinal direction of the display panel. The grating includes a plurality of grating units arranged in parallel; an acute angle between each grating unit and the transverse direction of the display panel is a predetermined angle; and the grating is configured to present a first image displayed by the plurality of first display units and a second image displayed by the plurality of second display units to a left eye and a right eye respectively. The 3D display device can reduce the granular sensation in viewing a 3D image and hence improve viewing comfort.

16 Claims, 8 Drawing Sheets

(58) Field of Classification Search
USPC .......................................................... 348/54
See application file for complete search history.

(56) References Cited

U.S. PATENT DOCUMENTS

| | | | | |
|---|---|---|---|---|
| 2011/0221655 A1* | 9/2011 | Fukui | ..................... | G09G 3/001 |
| | | | | 345/4 |
| 2011/0268196 A1* | 11/2011 | Suh | ..................... | H04N 13/0048 |
| | | | | 375/240.26 |
| 2012/0092763 A1* | 4/2012 | Song | ................. | G02B 27/2214 |
| | | | | 359/463 |
| 2012/0268697 A1 | 10/2012 | Inoue et al. | | |
| 2013/0194398 A1 | 8/2013 | Saito | | |
| 2013/0208357 A1 | 8/2013 | Saito | | |
| 2014/0139651 A1 | 5/2014 | Jiang et al. | | |

FOREIGN PATENT DOCUMENTS

| | | |
|---|---|---|
| CN | 101895777 A | 11/2010 |
| CN | 101900887 A | 12/2010 |
| CN | 102004324 A | 4/2011 |
| CN | 102213837 A | 10/2011 |
| CN | 102238409 A | 11/2011 |
| CN | 102510515 A | 6/2012 |
| CN | 202351520 U | 7/2012 |
| CN | 102749762 A | 10/2012 |
| CN | 203444166 U | 2/2014 |

OTHER PUBLICATIONS

Chinese Office Action of Chinese Application No. 201310412240.8, dated Jun. 5, 2014 with English translation.
Second Chinese Office Action of Chinese Application No. 201310412240.8, dated Nov. 15, 2014 with English Translation.
English translation of the International Preliminary Report on Patentability and Written Opinion of the International Searching Authority of PCT/CN2013/088599, dated Mar. 15, 2016.
English Translation of the International Search Report of PCT/CN2013/088599 published in English on Mar. 19, 2015.

* cited by examiner

THREE-DIMENSIONAL DISPLAY DEVICE

CROSS REFERENCE TO RELATED APPLICATIONS

This application is the National Stage of PCT/CN2013/088599 filed on Dec. 5, 2013, which claims priority under 35 U.S.C. § 119 of Chinese Application No. 201310412240.8 filed on Sep. 11, 2013, the disclosure of which is incorporated by reference. The international application under PCT article 21(2) was not published in English.

TECHNICAL FIELD

Embodiments of the present invention relate to a three-dimensional (3D) display device.

BACKGROUND

With the development of science and technology, people are no longer satisfied with the traditional two-dimensional (2D) image display. The two-view type 3D display technology has become the current compelling science and technology and has important strategic significance in the national economic development and the national security. Currently, users often view 3D images with the aid of external devices such as polarizing glasses, complementary color glasses, liquid crystal shutter glasses and head mounted displays (HMD). In this case, the vision of people's eyes is limited, and hence the users cannot perform other jobs while watching monitors or displays. Therefore, the two-view type glasses-free 3D display technology without external aids is currently hot in research in the display technology field in the world.

Currently, most two-view type glasses-free 3D display technologies are developed on the basis of binocular parallax and mainly includes a grating type 3D display technology. A display applying this kind of technologies is referred to as a grating type 3D display, and the grating type 3D display is formed by disposing a grating on a 2D matrix display panel. The grating may be a parallax barrier grating or a lenticular lens grating. The grating has the function of light splitting and has the function of image separation when applied to the display.

The principle of the grating type two-view 3D display technology is to dispose a grating on a light-entering side or a light-emitting side of a display panel. Due to the light splitting function of the grating, for instance, the left eye of a viewer in front of the display panel can only view odd pixel columns but cannot view even pixel columns while the right eye can only view the even pixel columns and cannot view the odd pixel columns. In this case, a 3D image with depth perception can be finally formed in the human brain by the integration of two images with horizontal parallax, respectively formed by the odd pixel columns and the even pixel columns respectively and viewed by the left eye and the right eye.

As illustrated in FIG. 1, in a display panel 10, RGB sub-pixels include left-eye sub-pixels (indicated as $R_L$, $G_L$ and $B_L$ respectively) and right-eye sub-pixels (indicated as $R_R$, $G_R$ and $B_R$ respectively). That is to say, data signals for left-eye images may be input into the $1^{st}$, $3^{rd}$, $5^{th}$, $7^{th}$, $9^{th}$ columns of sub-pixels and data signals for right-eye images may be input into the $2^{nd}$, $4^{th}$, $6^{th}$, $8^{th}$, $10^{th}$ . . . columns of sub-pixels. In this case, by adoption of a parallax barrier grating 201 as illustrated in FIG. 2 which is disposed on a light-emitting side of the display panel 10, the left eye of a viewer can only view a pattern as illustrated in FIG. 3 and the right eye of the viewer can only view a pattern as illustrated in FIG. 4, and finally a 3D image can be obtained through the integration of the two patterns in the human brain.

The grating type two-view 3D display technology is glasses-free 3D display technology which is most likely to achieve commercialization at present due to the advantages of simple structure, easy realization, low cost, and the like.

However, as illustrated in FIGS. 3 and 4, as the vertically disposed parallax barrier grating 201 divides the image displayed by the display panel into a left-eye image with candy stripes and a right-eye image with candy stripes, so that the 3D image identified by the viewer has candy stripes as illustrated in FIG. 5 inevitably. In this case, as for the viewer, the 3D image viewed by the viewer has strong granular sensation, and hence the viewing comfort can be affected.

SUMMARY

The embodiments of the present invention provide a 3D display device, which can reduce the granular sensation in viewing a 3D image and hence improve the viewing comfort.

One aspect of the present invention provides a 3D display device, which comprises a display panel and a grating disposed on one side of the display panel; the display panel includes a plurality of first display units and a plurality of second display units; the first display units and the second display units are alternately arranged in both a transverse direction and a longitudinal direction of the display panel; the grating includes a plurality of grating units arranged in parallel; an acute angle between each grating unit and the transverse direction of the display panel is a predetermined angle; and the grating is configured to present a first image displayed by the plurality of first display units and a second image displayed by the plurality of second display units to a left eye and a right eye respectively.

For instance, the predetermined angle may be 60 to 80 degree.

For instance, each first display unit or each second display unit may be a sub-pixel; the sub-pixel includes a first edge a parallel to the transverse direction of the display panel and a second edge b parallel to the longitudinal direction of the display panel; and the predetermined angle is arctan(b/a).

For instance, the grating may be a parallax bather grating.

For instance, the grating may be a lenticular lens grating.

For instance, the 3D display device may further comprise a driver module, and the driver module is configured to drive the plurality of first display units to display the first image and the plurality of second display units to display the second image.

For instance, the display panel may be a liquid crystal display (LCD) panel; and the grating is disposed on a light-entering side or a light-emitting side of the LCD panel. Optionally, the 3D display device may further comprise a backlight disposed on the light-entering side of the LCD panel; and the grating is disposed between the backlight and the LCD panel.

For instance, the display panel may be an organic light-emitting diode (OLED) display panel; and the grating is disposed on a light-emitting side of the OLED display panel.

With the 3D display device provided by the embodiments of the present invention, the viewer would not view continuously-provided candy stripes, so that the granular sensation when the viewer views the image can be reduced, and hence the comfort of the viewer while viewing the 3D image without glasses can be improved.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

REFERENCE NUMERALS

10—display panel; 101—first display unit; 102—second display unit; 1011—first sub-pixel display unit; 1021—second sub-pixel display unit; 201—parallax barrier grating; 201a—grating sheet; 201b—parallax barrier; 202—lenticular lens grating; 202a—lenticular lens.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 6:
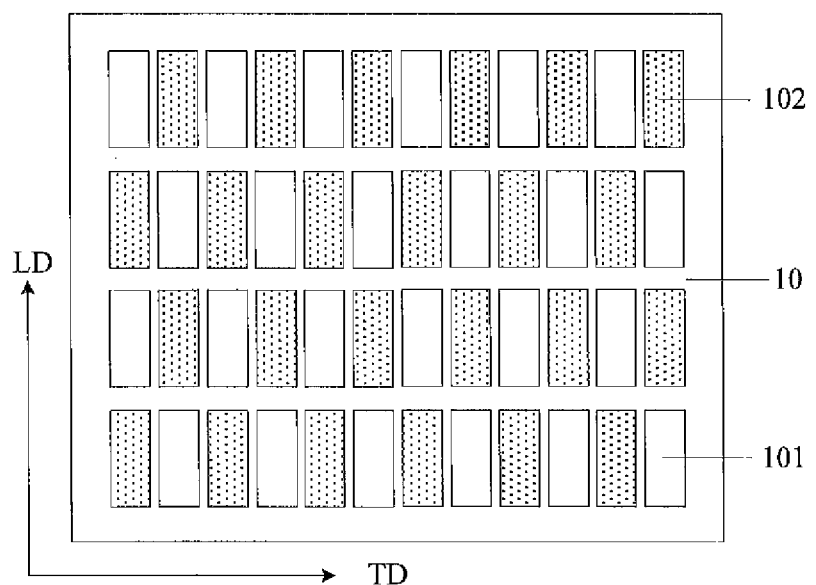
FIG. 6 is a schematic view of a display unit array of a 3D display device provided by an embodiment of the present invention.

An embodiment of the present invention provides a 3D display device, which comprises a display panel 10 and a grating disposed on one side of the display panel 10. As illustrated in FIG. 6, the display panel 10 includes a plurality of first display units 101 and a plurality of second display units 102; and the first display units 101 and the second display units 102 are alternately arranged in both the transverse direction (TD) and the longitudinal direction (LD) (the row direction and the column direction) of the display panel 10, namely, each first display unit 101 is adjacent to second display units 102 in both the transverse direction and the longitudinal direction, and correspondingly each second display unit 102 is adjacent to first display unit 101s in both the transverse direction and the longitudinal direction.

As illustrated in FIGS. 7 to 10, the grating includes a plurality of grating units arranged in parallel; the acute angle between each grating unit and the transverse direction of the display panel 10 is a predetermined angle θ; and the grating is configured to present a first image displayed by the plurality of first display units 101 and a second image displayed by the plurality of second display units 102 to the left eye and the right eye of a user.

3D display refers to the image obtained through the integration of a left-eye image and a right-eye image respectively received by the left eye and the right eye. In this case, for instance, the data signals for the left-eye image are input into the plurality of first display units 101 so that the plurality of first display units 101 display the first image as a whole and the first image is identified by the left eye and presented; and the data signals of the right-eye image are input into the plurality of second display units 102 so that the plurality of second display units 102 display the second image as a whole and the second image is identified by the right eye and presented. Finally, the 3D image can be obtained through the integration of the left-eye image and the right-eye image in the human brain when the user views the left-eye image and the right-eye image.

It should be noted that: firstly, when the display panel 10 is a display panel which can achieve display only with an external light source, e.g., an LCD panel, the arrangement of the grating on one side of the display panel may be involve: the grating is disposed on a light-entering side or a light-emitting side of the display panel; and when the display panel 10 is a self-luminous display panel, e.g., an OLED display panel, the arrangement of the grating on one side of the display panel may be that: the grating is disposed on a light-emitting side of the display panel.

Secondly, in an embodiment of the present invention, the grating has a periodicity.

Figure 7:
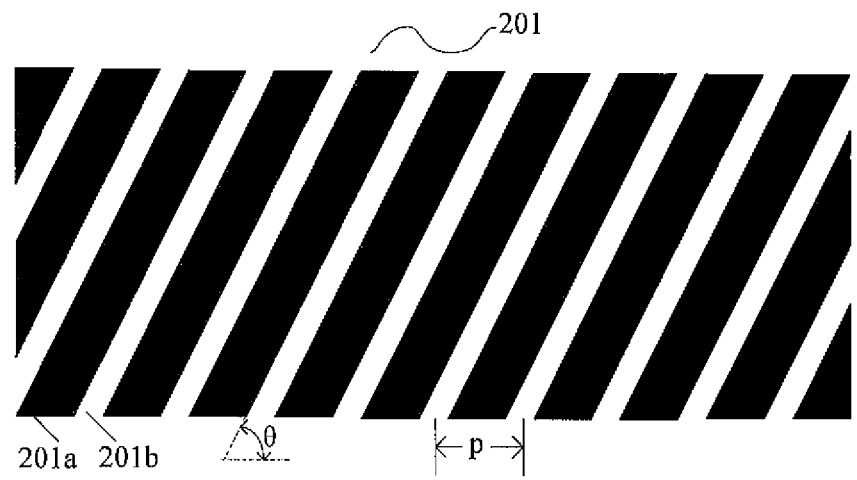
FIG. 7 is a schematic view 1 of a parallax barrier grating provided by an embodiment of the present invention.
Figure 8:
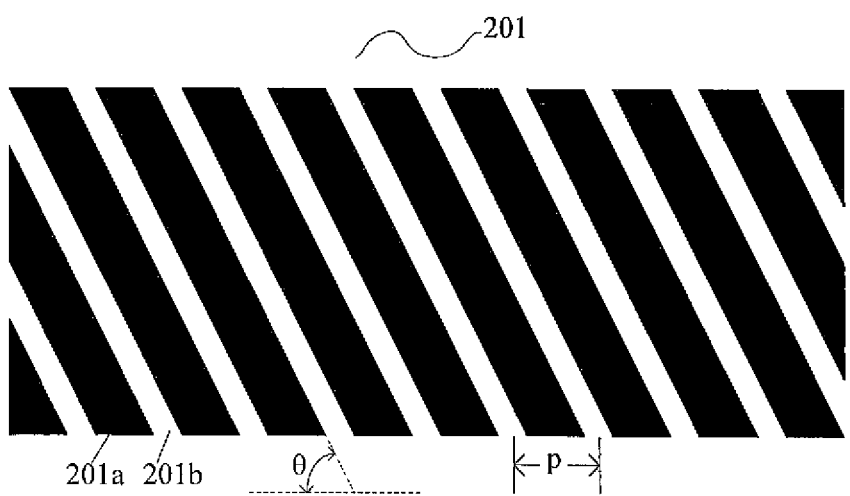
FIG. 8 is a schematic view 2 of the parallax barrier grating provided by an embodiment of the present invention.
Figure 9:
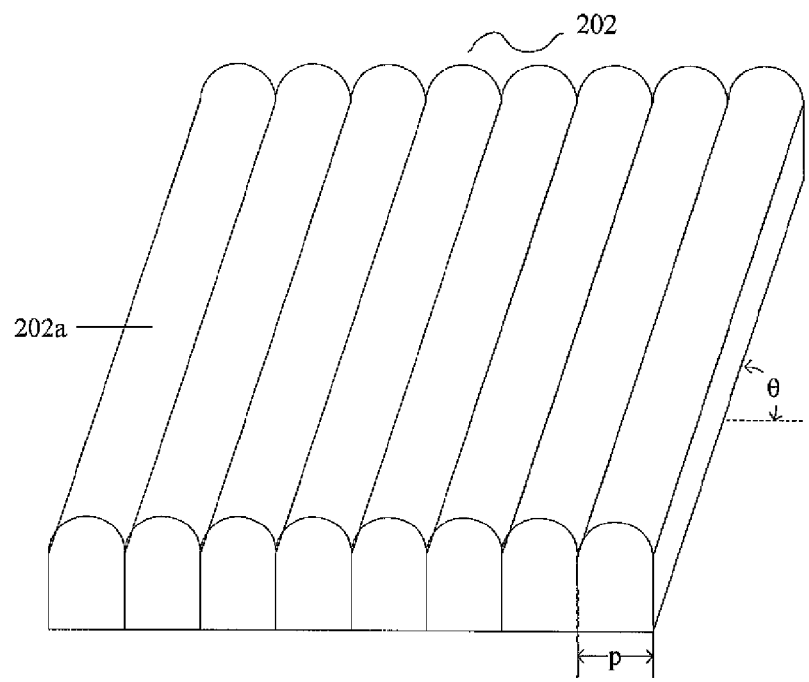
FIG. 9 is a schematic view 1 of a lenticular lens grating provided by an embodiment of the present invention.
Figure 10:
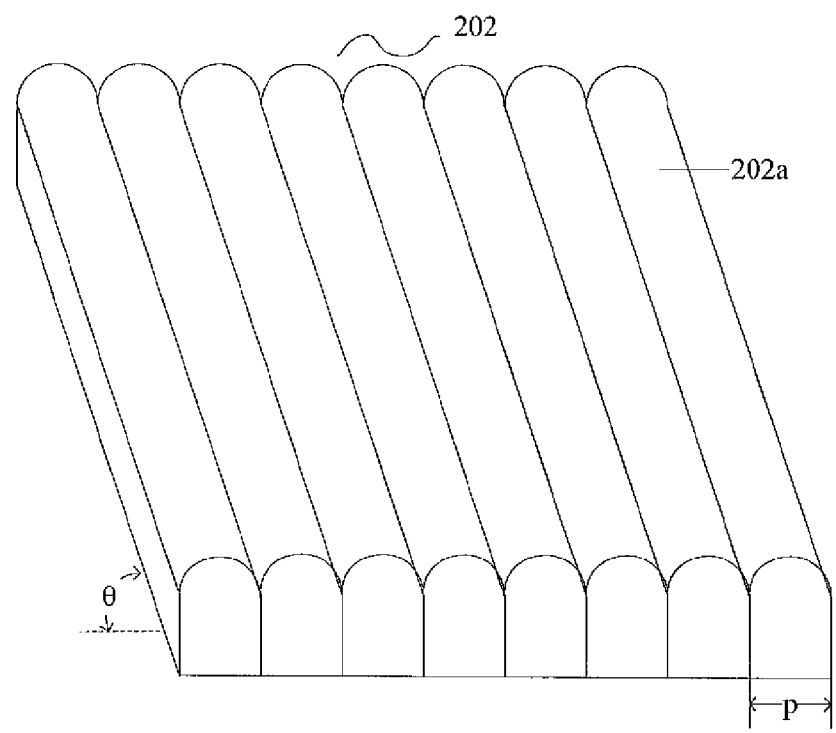
FIG. 10 is a schematic view 2 of the lenticular lens grating provided by an embodiment of the present invention.

Thirdly, the grating may be a parallax barrier grating 201 and may also be a lenticular lens grating 202. As illustrated in FIG. 7 or 8, when the grating is the parallax barrier grating 201, the grating units are grating sheets 201a of the parallax barrier grating 201. On the basis, one cycle of the parallax barrier grating 201 is formed by a grating sheet 201a and a parallax barrier 201b between the grating sheet and another adjacent grating sheet, and the parallax barrier grating 201 is formed by a plurality of such cycles. As illustrated in FIG. 9 or 10, when the grating is the lenticular lens grating 202, the grating units are lenticular lens 202a of the lenticular lens grating 202. On the basis, one cycle of the lenticular lens grating 202 is formed by one lenticular lens 202a, and the lenticular lens grating 202 is formed by a plurality of tightly arranged lenticular lens 202a. Moreover, one cycle of the lenticular lens grating 202 may also be formed by a separation portion between a lenticular lens 202a and another lenticular lens adjacent to the lenticular lens 202a.

Fourthly, the 3D display device may be an LCD TV, an LCD, an OLED TV, an OLED display, a mobile phone, a navigator, a pocket PC, an e-book or the like.

An embodiment of the present invention provides a 3D display device, which comprises a display panel and a grating disposed on one side of the display panel; the display panel includes a plurality of first display units and a plurality of second display units; the first display units and the second display units are alternately arranged in both the transverse direction and the longitudinal direction of the display panel; the grating includes a plurality of grating units arranged in parallel; the acute angle between each grating unit and the transverse direction of the display panel is a predetermined angle; and the grating is configured to present a first image displayed by the plurality of first display units and a second image displayed by the plurality of second display units to the left eye and the right eye of a user.

Figure 1:
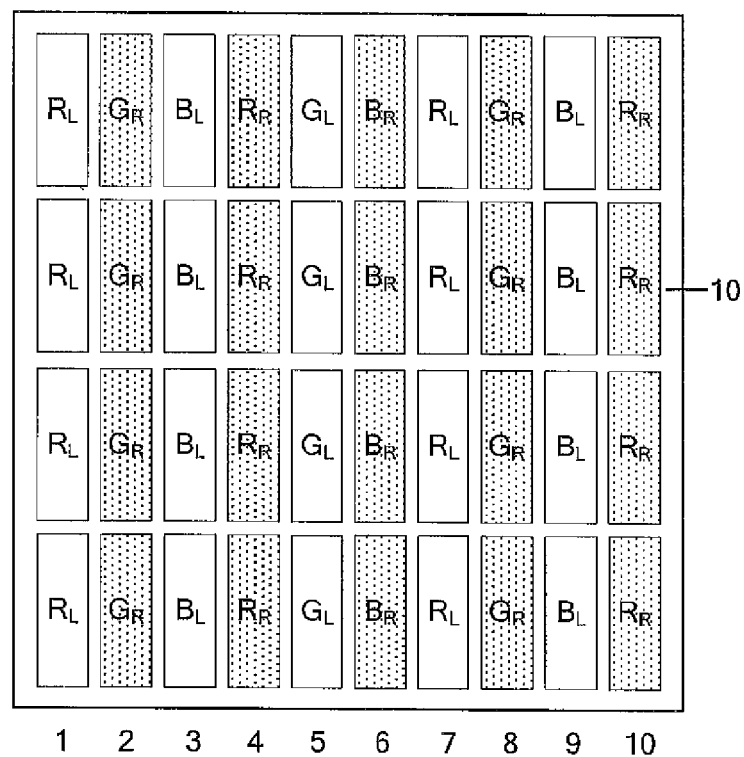
FIG. 1 is a schematic view of a sub-pixel array on a conventional display panel.
Figure 2:
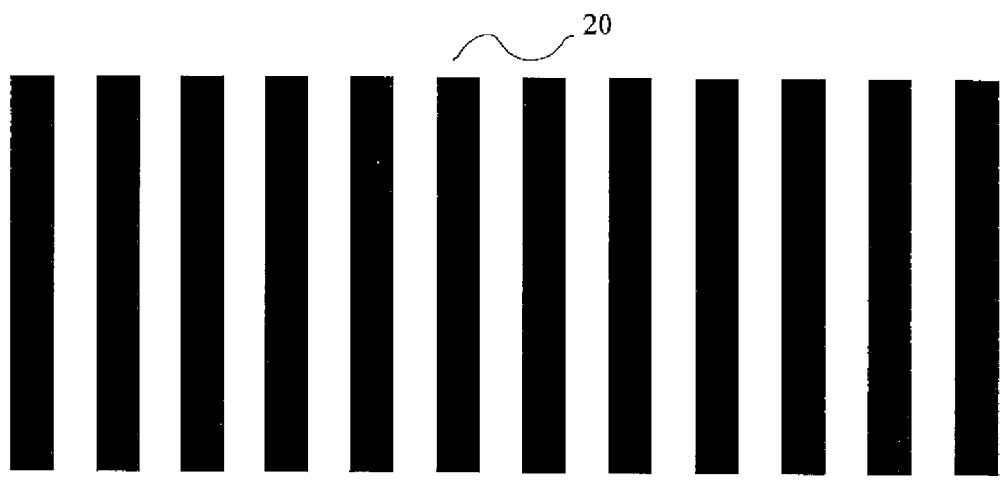
FIG. 2 is a schematic view of a parallax barrier grating vertically disposed on a light-entering side or a light-emitting side of the conventional display panel.
Figure 3:
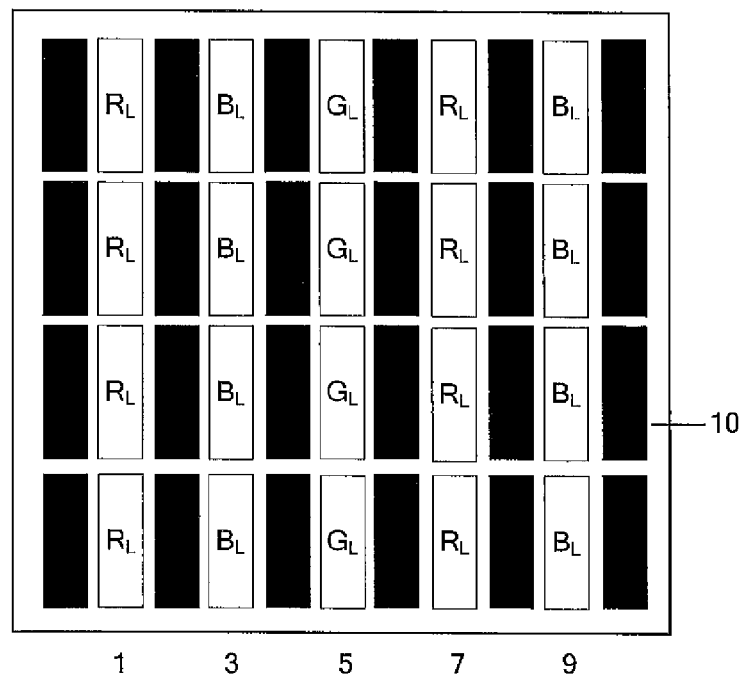
FIG. 3 is a schematic view of a left-eye image formed by the vertically disposed parallax barrier grating and the sub-pixel array display panel as illustrated in FIG. 1.
Figure 4:
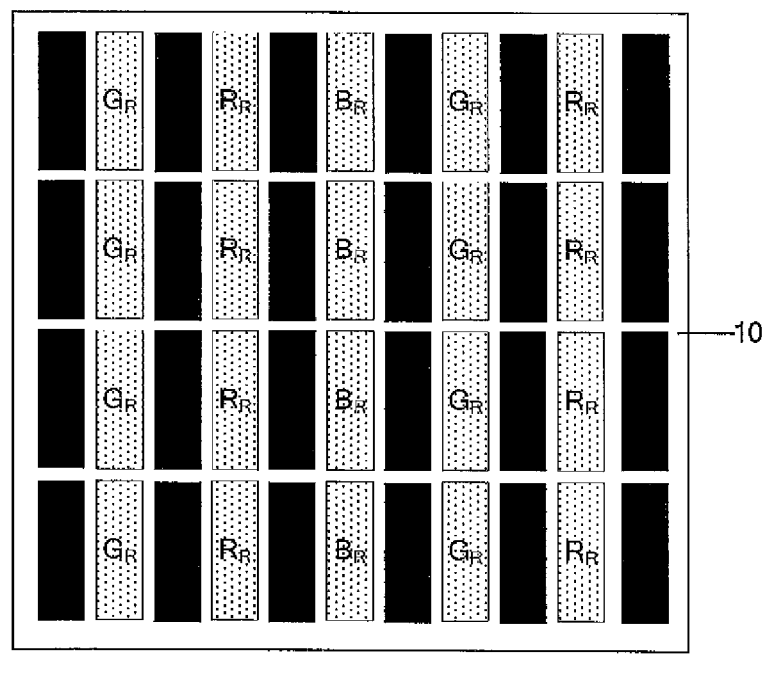
FIG. 4 is a schematic view of a right-eye image formed by the vertically disposed parallax barrier grating and the sub-pixel array display panel as illustrated in FIG. 1.
Figure 5:
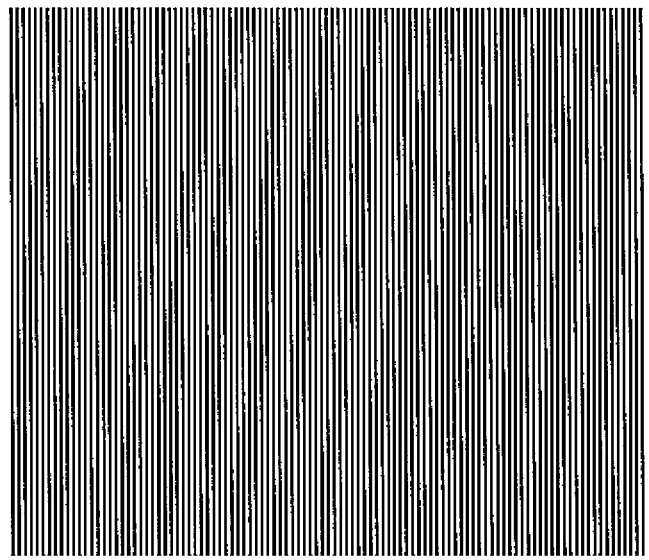
FIG. 5 is a schematic view of a 3D image having strong granular sensation viewed by a viewer through the conventional 3D display device.

As illustrated in FIGS. 3 to 5, as left-eye sub-pixels and right-eye sub-pixels are alternately arranged in the transverse direction or the longitudinal direction of a display panel and a vertical angle is formed between each grating unit of the grating and the transverse direction or the longitudinal direction of the display panel, an image displayed by the display panel is divided into a left-eye image with continuously-provided candy stripes and a right-eye image with continuously-provided candy stripes, so that a 3D image received by a viewer has continuously-provided candy stripes, and hence the granular sensation is strong when the viewer views the image and the viewing comfort cannot be achieved.

Figure 11:
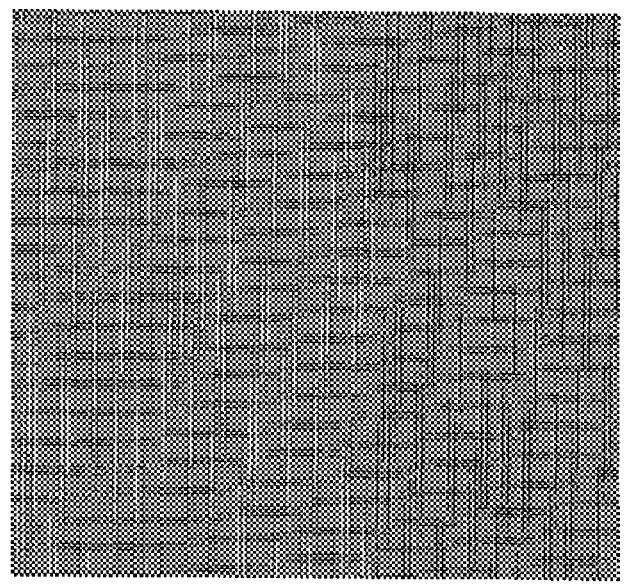
FIG. 11 is a schematic view of a 3D image with small granular sensation viewed by the viewer through the 3D display device provided by an embodiment of the present invention.

However, in an embodiment of the present invention, as the first display units and the second display units are alternately arranged in both the transverse direction and the longitudinal direction of the display panel, and the acute angle between each grating unit and the transverse direction of the display panel is a predetermined angle, the first image displayed by the plurality of first display units is received by the left eye and a left-eye image is presented, and the second image displayed by the plurality of second display units is received by the right eye and a right-eye image is presented. Because the left-eye image is obtained by the left eye identifying the first image displayed by the plurality of first display units alternately provided on the display panel as a whole and the right-eye image is obtained by the right eye identifying the second image displayed by the plurality of second display units alternately provided on the display panel on the whole, as illustrated in FIG. 11, when the left-eye image and the right-eye image are integrated together, the viewer cannot view continuously-provided candy stripes, so that the granular sensation when the viewer views the image can be reduced, and hence the comfort can be improved when the viewer views the 3D image without glasses.

Herein, because the acute angle between each grating emit and the transverse direction of the display panel is a predetermined angle in the embodiment of the present invention, the viewer cannot view the continuously-provided candy stripes after the integration of the first image and the second image respectively viewed by the left eye and the right eye of the viewer. However, when the acute angle is too large or too small, the degree of granular sensation when the viewer views the image is slightly reduced. Therefore, in order to obviously reduce the granular sensation of the image viewed by the viewer, in the embodiment of the present invention, preferably, the predetermined angle θ is 60 to 80 degree.

More preferably, any first display unit 101 or any second display unit 102 may be a sub-pixel (e.g., red, green or blue); the sub-pixel includes a first edge a parallel to the transverse direction of the display panel 10 and a second edge b parallel to the longitudinal direction of the display panel 10; and the predetermined angle θ is arctan(b/a).

In this case, the grating unit with the predetermined angle θ is parallel to a diagonal of the sub-pixel, so that the granular sensation of the image viewed by the viewer can be maximally reduced.

Moreover, the grating may be a parallax barrier grating; or the grating may be a lenticular lens grating.

Because the parallax barrier grating is widely applied currently and has a simple manufacturing process, in one example of the embodiment of the present invention, the grating is a parallax barrier grating 201, and the aperture ratio of the parallax barrier grating 201 is ⅓ to ½. In order to guarantee high brightness of the image viewed by the viewer, the aperture ratio of the parallax barrier grating 201 in the embodiment of the present invention is ½. Of course, as described above, the grating may also be a lenticular lens grating 202.

As illustrated in FIGS. 7 and 8, the parallax barrier grating 201 includes light shield sections formed by grating sheets 201a and light transmission sections formed by parallax barriers 201b, and the aperture ratio is the ratio of the area of the light transmission sections to the total amount of the area of the light transmission sections and the area of the light shield sections.

Figure 12:
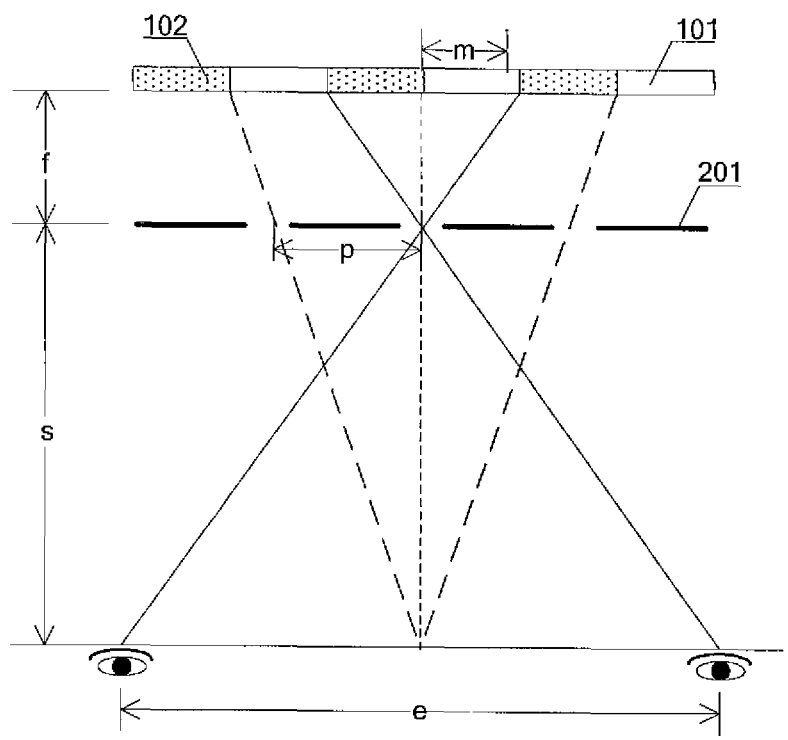
FIG. 12 is a two-view 3D optical path diagram illustrating the state when the parallax barrier grating provided by an embodiment of the present invention is disposed on a light-emitting side of the display panel.

On the basis, where the parallax barrier grating 201 is disposed on a light-emitting side of the display panel, as illustrated in FIG. 12, the relational formula between the cycle length p of one cycle of the parallax barrier grating 201 and the length m of one display unit in the cycle length direction can be derived from the optical path diagram of the parallax bather grating 201, namely formula 1:

$$p = \frac{2m}{1 + \frac{m}{e/2}}$$

can be derived from the following formulas:

$$\frac{f}{m} = \frac{s}{e/2};$$
$$\frac{p}{2m} = \frac{s}{s+f};$$

where "e" refers to the interpupillary distance; "f" refers to the distance from the parallax barrier grating to the light-emitting side of the display panel; and "s" refers to the distance from the human eye to the parallax barrier grating.

When the lenticular lens grating 202 is disposed on the light-emitting side of the display panel, formula 1 is also applicable thereto. No further description will be given to the derivation process of the formula.

Figure 13:
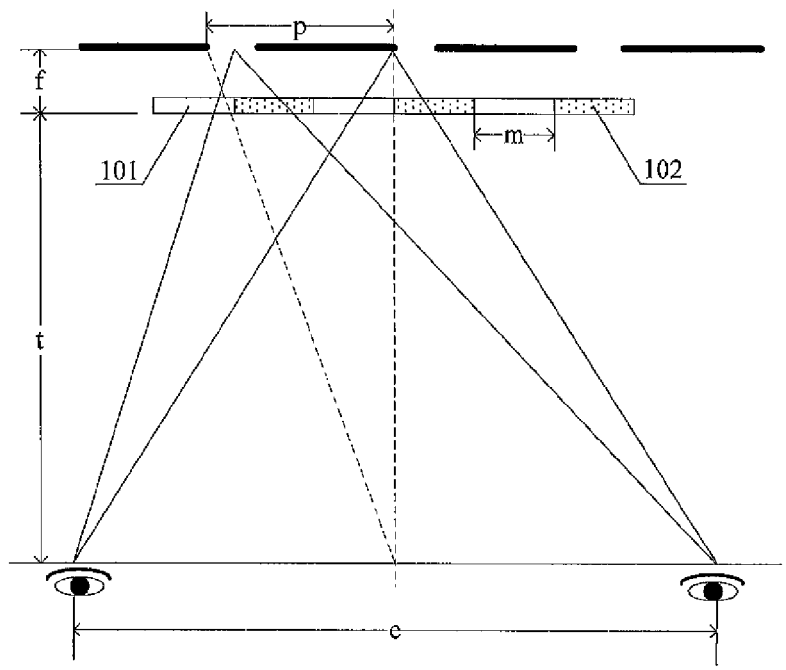
FIG. 13 is a two-view 3D optical path diagram illustrating the state when the parallax barrier grating provided by an embodiment of the present invention is disposed on a light-entering side of the display panel.

Moreover, when the parallax barrier grating 201 is disposed on a light-entering side of the display panel, as illustrated in FIG. 13, the relational formula between the cycle length p of one cycle of the parallax barrier grating 201 and the length m of one display unit in the cycle length direction can be derived from the optical path diagram of the parallax barrier grating 201, namely formula 2:

$$p = \frac{2m}{1 - m/e}$$

can be derived from the following formulas:

$$\frac{m}{e} = \frac{f}{t+f};$$
$$\frac{p}{2m} = \frac{t+f}{t};$$

where "e" refers to the interpupillary distance; "f" refers to the distance from the parallax barrier grating to the light-emitting side of the display panel; and "t" refers to the distance from the human eye to the light-emitting side of the display unit.

When the lenticular lens grating 202 is disposed on the light-entering side of the display panel, the formula 2 is also applicable thereto. No further description will be given to the derivation process of the formula.

Moreover, as illustrated in FIG. 7 or 8, where the parallax barrier grating 201 is disposed on the light-emitting side of the display panel, the cycle length p of one cycle of the parallax barrier grating 201 can be determined by formula 1; where the parallax barrier grating 201 is disposed on the light-entering side of the display panel, the cycle length p of one cycle of the parallax barrier grating 201 can be determined by formula 2; and in this way the cycle length p of the parallax barrier grating 201 required for achieving the glasses-free 3D effect can be determined. Moreover, in order to reduce the granular sensation of the 3D image viewed by viewers, the acute angle between the grating unit of the parallax barrier grating 201 and the transverse direction of the display panel is a predetermined angle θ. Where the value θ is determined, the parallax barrier grating 201 with a fixed cycle length p and a fixed inclination angle of parallax barriers 201b can be obtained.

Similarly, as illustrated in FIG. 9 or 10, where the lenticular lens grating 202 is disposed on the light-emitting side of the display panel, the cycle length p of one cycle of the lenticular lens grating 202 can also be determined by formula 1; where the lenticular lens grating 202 is disposed on the light-entering side of the display panel, the cycle length p of one cycle of the lenticular lens grating 202 can also be determined by the formula 2; and in this way the cycle length p of the lenticular lens grating 202 required for achieving the glasses-free 3D effect can be determined. Moreover, in order to reduce the granular sensation of the 3D image viewed by the viewer, the acute angle between lenticular lens 202a of the lenticular lens grating 202 and the transverse direction of the display panel is a predetermined angle θ. Where the value θ is determined, the lenticular lens grating 202 with a fixed cycle length p and a fixed inclination angle of the lenticular lens 202a can be obtained.

Further description will be given to the 3D display device with reference to the following two embodiments.

Embodiment 1

The 3D display device comprises a display panel 10 and a parallax barrier grating 201 disposed on a light-emitting side of the display panel 10.

Figure 14:
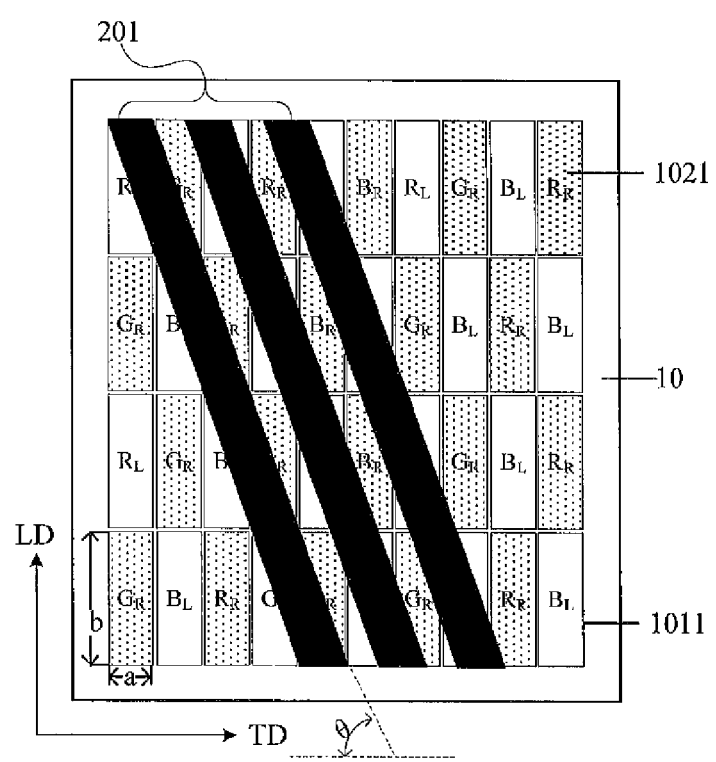
FIG. 14 is a schematic view of a sub-pixel array of a 3D display device provided by an embodiment 1 of the present invention.

As illustrated in FIG. 14, the display panel 10 includes a plurality of sub-pixels; each sub-pixel includes a first edge a parallel to the transverse direction of the display panel 10 and a second edge b parallel to the longitudinal direction of the display panel 10; the plurality of sub-pixels are divided into a plurality of first sub-pixel display units 1011 (indicated as $R_L$, $G_L$ and $B_L$ respectively) and a plurality of second sub-pixel display units 1021 (indicated as $R_R$, $G_R$ and $B_R$ respectively); and the first sub-pixel display units 1011 and the second sub-pixel display units 1021 are alternately arranged in both the transverse direction and the longitudinal direction of the display panel 10.

As illustrated in FIG. 7, the parallax barrier grating 201 includes a plurality of grating sheets periodically arranged in parallel and a parallax barrier 201b between any two adjacent grating sheets; and the acute angle θ between each grating sheet 201a and the transverse direction of the display panel 10 is arctan(b/a). In addition, the cycle length direction of the parallax barrier grating 201 is parallel to the transverse direction of the display panel; the cycle length of one cycle of the parallax barrier grating 201 is:

$$p = \frac{2a}{1 + \frac{a}{e/2}},$$

and the aperture ratio is ½.

Figure 15:
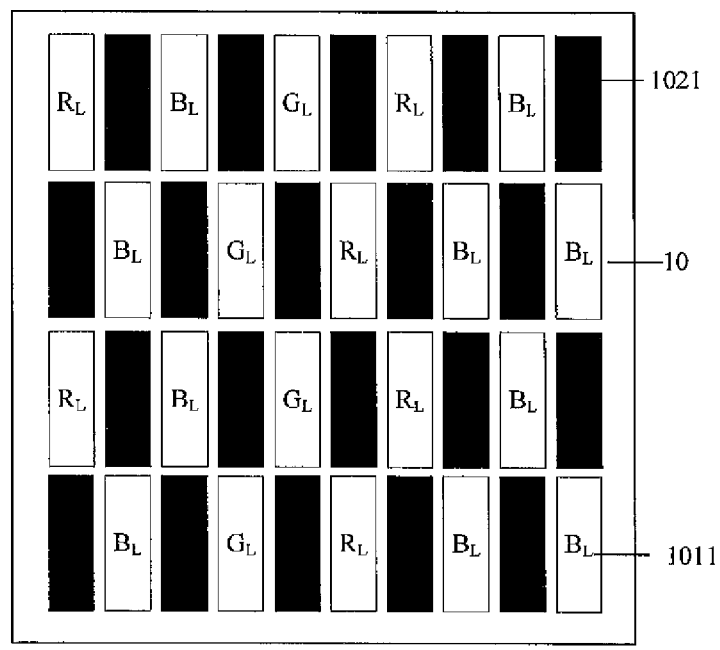
FIG. 15 is a schematic view of a left-eye image formed by an obliquely disposed parallax barrier grating as illustrated in FIG. 7 and a sub-pixel array display panel as illustrated in FIG. 14.
Figure 16:
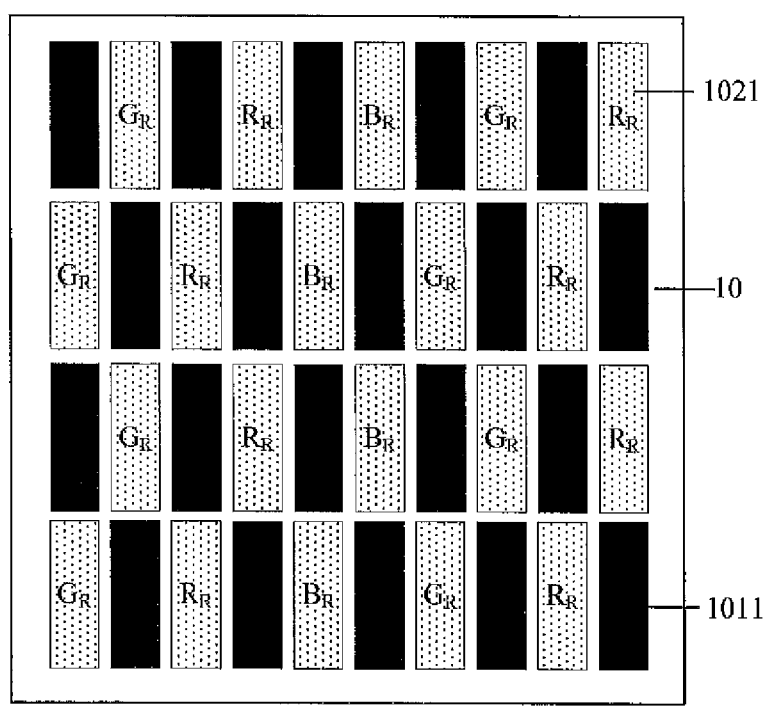
FIG. 16 is a schematic view of a right-eye image formed by the obliquely disposed parallax barrier grating as illustrated in FIG. 7 and the sub-pixel array display panel as illustrated in FIG. 1.

In this way, a left-eye image as illustrated in FIG. 15 is presented after a first image displayed by the alternately arranged first sub-pixel display units 1011 is received by a left eye; a right-eye image as illustrated in FIG. 16 is presented after a second image displayed by the alternately arranged second sub-pixel display units 1021 is received by a right eye; and the left-eye image and the right-eye image are finally integrated into a 3D image in the human brain, and hence a viewer would not view continuously-provided candy stripes. Therefore, the granular sensation when the viewer views the image can be reduced, and hence the comfort when the viewer views the 3D image without glasses can be improved.

Embodiment 2

The 3D display device may also comprise a display panel 10 and a lenticular lens grating 202 disposed on a light-emitting side of the display panel 10.

As illustrated in FIG. 14, the display panel 10 includes a plurality of sub-pixels; each sub-pixel includes a first edge a parallel to the transverse direction of the display panel 10 and a second edge b parallel to the longitudinal direction of the display panel 10; the plurality of sub-pixels are divided into a plurality of first sub-pixel display units 1011 (indicated as $R_L$, $G_L$ and $B_L$ respectively) and a plurality of second sub-pixel display units 1021 (indicated as $R_R$, $G_R$ and $B_R$ respectively); and the first sub-pixel display units 1011 and the second sub-pixel display units 1021 are alternately arranged in both the transverse direction and the longitudinal direction of the display panel 10.

As illustrated in FIG. 9, the lenticular lens grating 202 includes a plurality of lenticular lens 202a tightly arranged in parallel; and the acute angle θ between each lenticular lens 202a and the transverse direction of the display panel 10 is arctan(b/a). In addition, the cycle length direction of the lenticular lens grating 202 is parallel to the transverse direction of the display panel; and the cycle length of one cycle of the lenticular lens grating 202 is:

$$p = \frac{2a}{1 + \frac{a}{e/2}}.$$

In this way, a left-eye image as illustrated in FIG. 15 is presented after a first image displayed by the alternately arranged first sub-pixel display units 1011 is received by a left eye; a right-eye image as illustrated in FIG. 16 is presented after a second image displayed by the alternately arranged second sub-pixel display units 1021 is received by a right eye; and the left-eye image and the right-eye image are finally integrated into a 3D image in the human brain, and hence a viewer cannot view continuously-provided candy stripes. Therefore, the granular sensation when the viewer views the image can be reduced, and hence the comfort when the viewer views the 3D image without glasses can be improved.

In the embodiment of the present invention, the 3D display device 10 may further comprise a driver module. The driver module is configured to drive a plurality of first display units 101 to display a first image and a plurality of second display units 102 to display a second image, for instance, to provide first display signals for the plurality of first display units 101 and second display signals for the plurality of second display units 102 simultaneously or alternately. For instance, in the case that the driver module alternately drives the plurality of first display units 101 and the plurality of second display units 102, the driver module provides signals for displaying the first image (e.g., a left-eye image) for the plurality of first display units 101 and meanwhile provides a black screen signal for the plurality of second display units 102, and next provides signals for displaying the second image (e.g., a right-eye image) for the plurality of second display units 102 and meanwhile provides a black screen signal for the plurality of first display units 101.

As illustrated in FIGS. 15 and 16, the driver module is configured to drive the plurality of first sub-pixel display units 1011 to display a first image and the plurality of second sub-pixel display units 1021 to display a second image.

In addition, the display panel 10 may be an LCD panel and may also be an OLED display panel, and of course may also be a display panel of other type.

When the display panel 10 is an LCD panel, the grating may be disposed on a light-entering side or a light-emitting side of the LCD panel. Moreover, the 3D display device further comprises a backlight disposed on the light-entering side of the LCD panel; and the grating may be disposed between the backlight and the LCD panel.

Optionally, when the display panel 10 is an OLED display panel, the grating is disposed on a light-emitting side of the OLED display panel.

The foregoing is only the preferred embodiments of the present invention and not intended to limit the scope of protection of the present invention. The scope of protection of the present invention should be defined by the appended claims.

The invention claimed is:

1. A three-dimensional (3D) display device, comprising a display panel and a grating disposed on one side of the display panel, wherein
   the display panel includes a plurality of first display units and a plurality of second display units; the first display units and the second display units are alternately arranged in both a transverse direction and a longitudinal direction of the display panel;
   the grating includes a plurality of grating units arranged in parallel; an acute angle between each grating unit and the transverse direction of the display panel is a predetermined angle; and the grating is configured to present a first image displayed by the plurality of first display units and a second image displayed by the plurality of second display units to a left eye and a right eye respectively;
   each first display unit or each second display unit is a sub-pixel;
   the sub-pixel includes a first edge a parallel to the transverse direction of the display panel and a second edge b parallel to the longitudinal direction of the display panel;
   each grating unit is parallel to the diagonal direction of the sub-pixel; and
   when the grating is disposed on a light-entering side of the display panel, a cycle length p of one cycle of the grating is $$p = \frac{2m}{1 - m/e};$$

when the grating is disposed on a light-emitting side of the display panel, a cycle length p of one cycle of the grating is $$p = \frac{2m}{1 + \frac{m}{e/2}},$$

wherein m refers to an average length of the first display unit and the second display unit in a cycle length direction, and e refers to an interpupillary distance.

2. The 3D display device according to claim 1, wherein the predetermined angle is 60 to 80 degree.

3. The 3D display device according to claim 1, wherein the grating comprises a parallax barrier grating.

4. The 3D display device according to claim 1, wherein the grating comprises a lenticular lens grating.

5. The 3D display device according to claim 1, wherein the 3D display device further comprises a driver module,
   the driver module is configured to drive the plurality of first display units to display a first image and the plurality of second display units to display a second image.

6. The 3D display device according to claim 1, wherein the display panel is a liquid crystal display (LCD) panel; and the grating is disposed on a light-entering side or a light-emitting side of the LCD panel.

7. The 3D display device according to claim 6, wherein the 3D display device further comprises a backlight disposed on a light-entering side of the LCD panel; and
the grating is disposed between the backlight and the LCD panel.

8. The 3D display device according to claim 1, wherein the display panel is an organic light-emitting diode (OLED) display panel; and
the grating is disposed on a light-emitting side of the OLED display panel.

9. The 3D display device according to claim 3, wherein the display panel is a liquid crystal display (LCD) panel; and
the grating is disposed on a light-entering side or a light-emitting side of the LCD panel.

10. The 3D display device according to claim 9, wherein the 3D display device further comprises a backlight disposed on a light-entering side of the LCD panel; and
the grating is disposed between the backlight and the LCD panel.

11. The 3D display device according to claim 3, wherein the display panel is an organic light-emitting diode (OLED) display panel; and
the grating is disposed on a light-emitting side of the OLED display panel.

12. The 3D display device according to claim 4, wherein the display panel is a liquid crystal display (LCD) panel; and
the grating is disposed on a light-entering side or a light-emitting side of the LCD panel.

13. The 3D display device according to claim 12, wherein the 3D display device further comprises a backlight disposed on a light-entering side of the LCD panel; and
the grating is disposed between the backlight and the LCD panel.

14. The 3D display device according to claim 4, wherein the display panel is an organic light-emitting diode (OLED) display panel; and
the grating is disposed on a light-emitting side of the OLED display panel.

15. The 3D display device according to claim 5, wherein the display panel is a liquid crystal display (LCD) panel; and
the grating is disposed on a light-entering side or a light-emitting side of the LCD panel.

16. The 3D display device according to claim 5, wherein the display panel is an organic light-emitting diode (OLED) display panel; and
the grating is disposed on a light-emitting side of the OLED display panel.

* * * * *